United States Patent
Ferrantelli et al.

(10) Patent No.: US 7,320,292 B1
(45) Date of Patent: Jan. 22, 2008

(54) PET FEEDING SYSTEM AND METHOD OF USE

(76) Inventors: Salvatore Ferrantelli, 8817 Cadhay Dr., Hudson, FL (US) 34667; Concetta M. Ferrantelli, 8817 Cadhay Dr., Hudson, FL (US) 34667

( * ) Notice: Subject to any disclaimer, the term of this patent is extended or adjusted under 35 U.S.C. 154(b) by 0 days.

(21) Appl. No.: 11/725,003

(22) Filed: Mar. 16, 2007

(51) Int. Cl.
*A01K 5/01* (2006.01)

(52) U.S. Cl. .................. 119/61.56; 220/574.3

(58) Field of Classification Search ............ 119/61.56, 119/61.54, 61.5; D30/121, 129; 220/573.4, 220/574.3; 294/54.5, 55, 1.4
See application file for complete search history.

(56) References Cited

U.S. PATENT DOCUMENTS

| | | | | |
|---|---|---|---|---|
| 730,082 A * | 6/1903 | Bates | ............ | 220/574.3 |
| D105,450 S * | 7/1937 | Clifton | ............ | D30/130 |
| 2,170,040 A * | 8/1939 | Stuart | ............ | 220/574 |
| 3,076,579 A * | 2/1963 | Kuhlman | ............ | 220/574.3 |
| 3,527,192 A | 9/1970 | Ferrara | | |
| 3,698,594 A * | 10/1972 | Boehlert | ............ | 220/495.01 |
| 4,800,845 A * | 1/1989 | Budd | ............ | 119/61.5 |
| 4,828,134 A * | 5/1989 | Ferlanti | ............ | 220/573.1 |
| 4,966,297 A * | 10/1990 | Doty | ............ | 220/23.83 |
| 5,560,316 A * | 10/1996 | Lillelund et al. | ............ | 119/61.5 |
| 5,782,374 A * | 7/1998 | Walker | ............ | 220/23.87 |
| 5,887,545 A * | 3/1999 | Cuttress | ............ | 119/61.56 |
| 6,237,803 B1 * | 5/2001 | Sarnoff et al. | ............ | 220/743 |
| 6,311,640 B1 * | 11/2001 | Mercado | ............ | 119/51.01 |
| 6,644,241 B2 * | 11/2003 | Brown | ............ | 119/61.5 |
| 6,681,719 B1 * | 1/2004 | Warner | ............ | 119/61.56 |
| 6,892,896 B2 * | 5/2005 | Barniak, Jr. | ............ | 220/573.4 |
| 7,204,202 B2 * | 4/2007 | Behun et al. | ............ | 119/61.5 |
| 2006/0283397 A1 * | 12/2006 | Loeffelholz | ............ | 119/61.56 |

* cited by examiner

*Primary Examiner*—Yvonne R. Abbott
(74) *Attorney, Agent, or Firm*—Ted Masters

(57) ABSTRACT

A pet feeding system includes a dish having an upwardly projecting elongated handle. A liner is shaped and dimensioned to fit over the dish. An anti-rotation mechanism prevents the liner from rotating with respect to the dish.

2 Claims, 7 Drawing Sheets

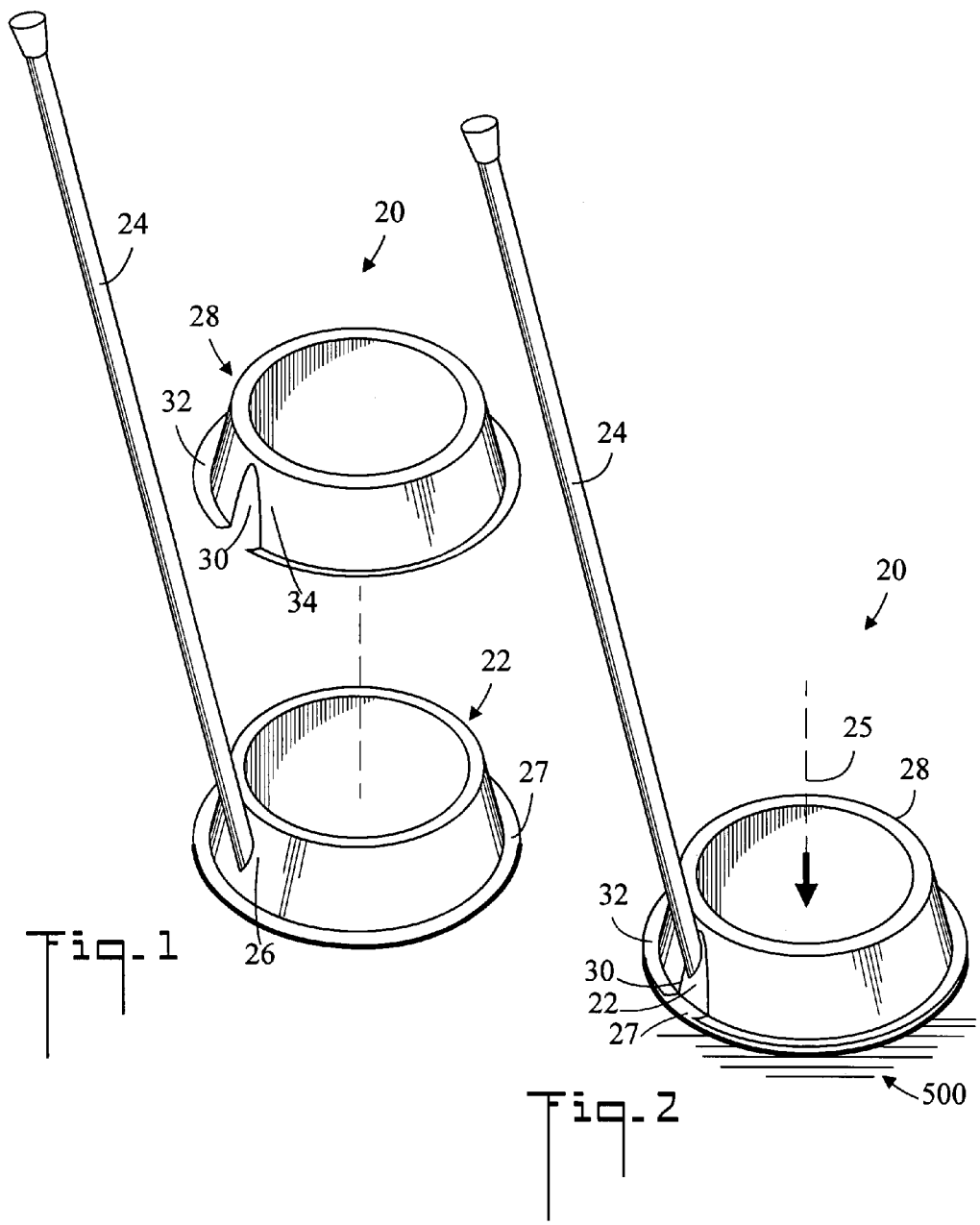

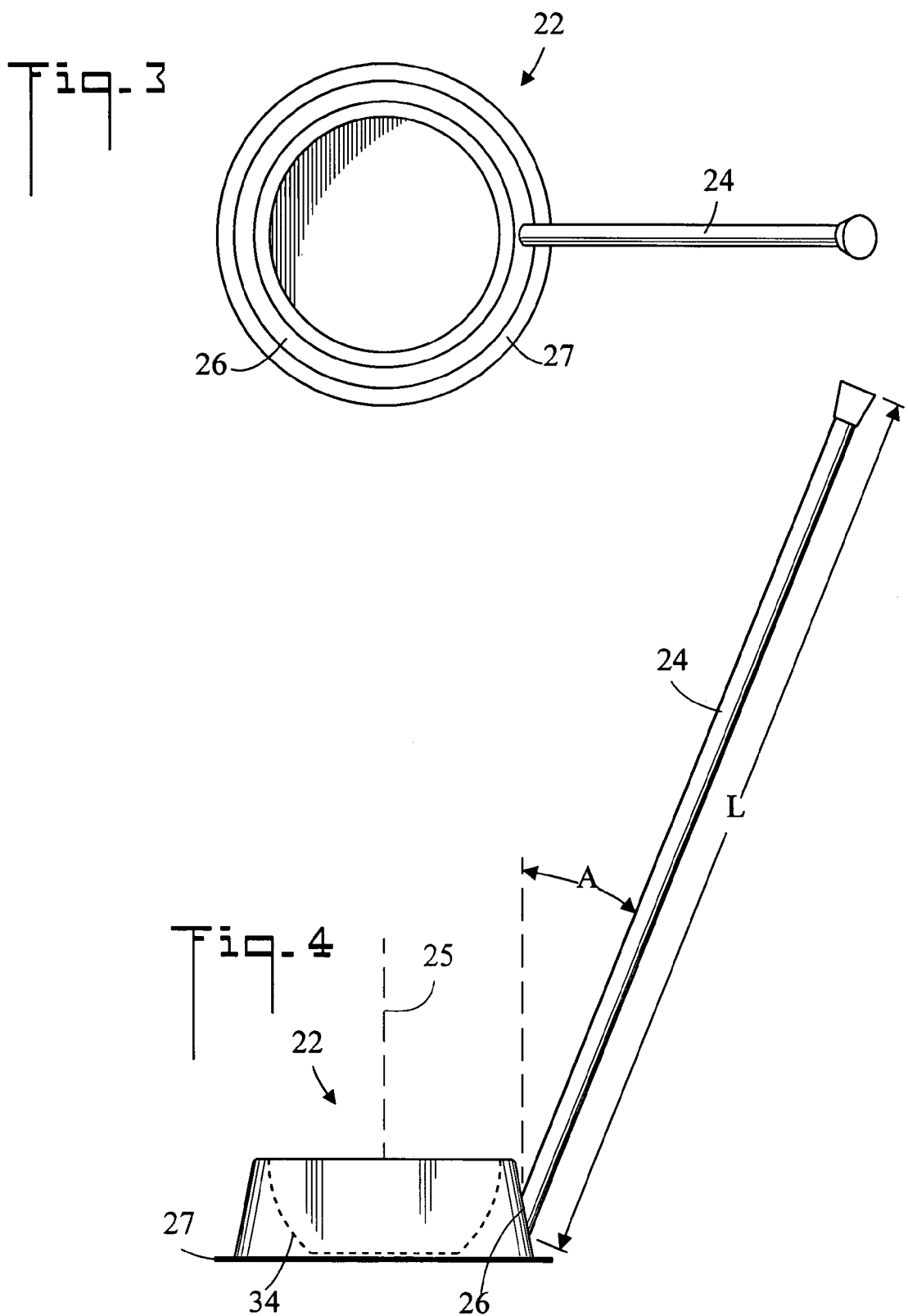

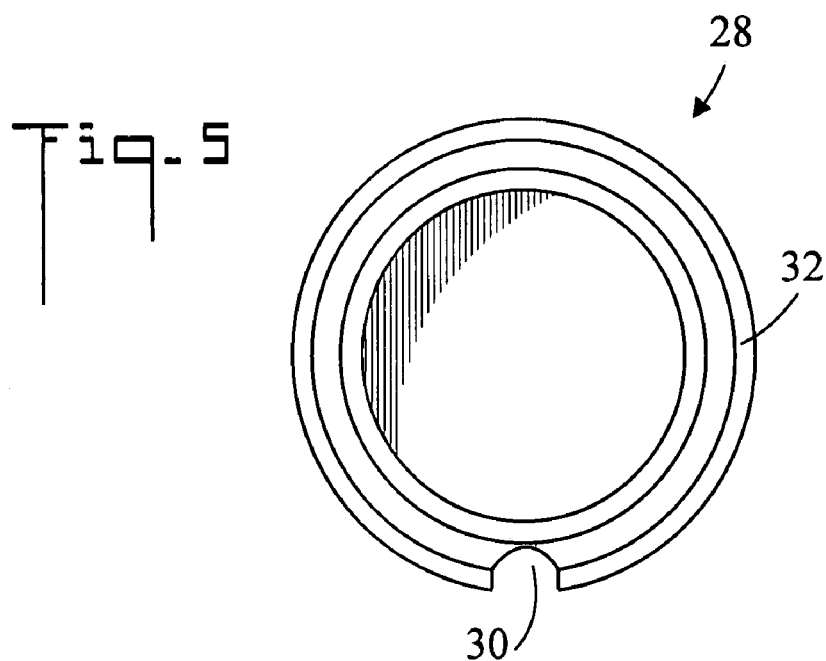
Fig_5
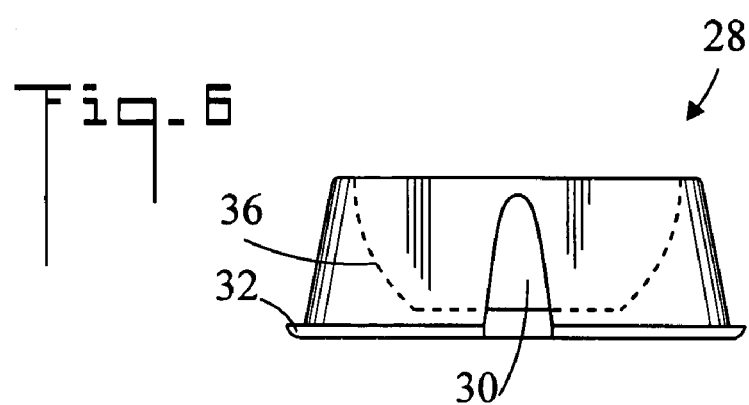
Fig_6
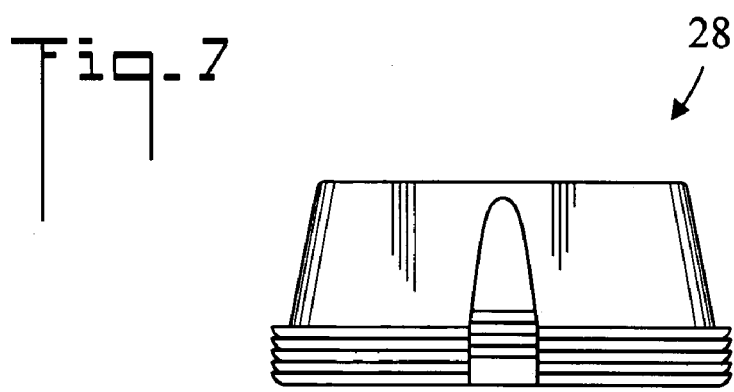
Fig_7

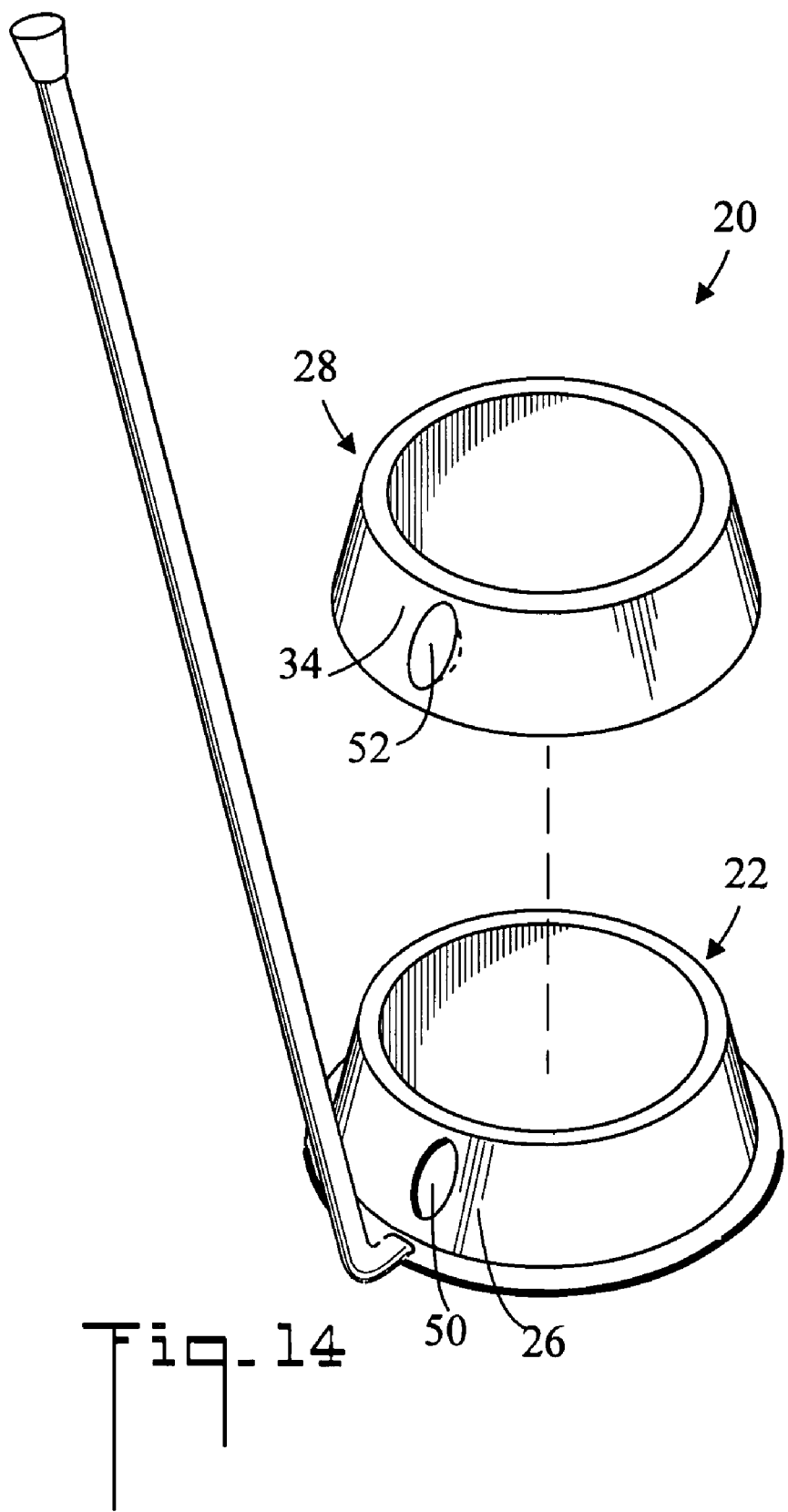
Fig_14

PET FEEDING SYSTEM AND METHOD OF USE

TECHNICAL FIELD

The present invention pertains generally to the feeding of pets, and more particularly to a pet feeding system which has a dish with a handle, and single use liners which fit over the dish.

BACKGROUND OF THE INVENTION

Pet food is typically put in dishes which are placed on the floor thereby allowing the pet to eat or drink. The dish must be cleaned after each use to maintain sanitary conditions. Also, the elderly or physically disabled can experience difficulty in both lowering the dish to the floor and raising the dish from the floor.

BRIEF SUMMARY OF THE INVENTION

The present invention is directed to a pet feeding system which enhances the clean up process, and also has a long handle which eases the process of placing and picking up the dish. The pet feeding system of the present invention includes a feeding dish to which is attached an elongated upwardly projecting handle. The handle allows a person to conveniently lower the dish to the floor and raise the dish from the floor. Additionally, the pet feeding system includes a disposable single use liner which is placed over the dish. The liner is shaped and dimensioned to fit closely over the dish. An anti-rotation mechanism prevents the liner from rotating as the pet consumes food from the lined dish. In one embodiment of the invention, the anti-rotation mechanism consists of the liner having a notch or cutout for receiving the handle. With the handle disposed in the notch, the liner cannot rotate with respect to the dish. When the pet has finished eating, the liner is removed and discarded. The liner is constructed of paper or a polymer similar to a disposable plate.

In accordance with a preferred embodiment of the invention, a pet feeding system includes a dish. An upwardly projecting handle is connected to the dish. A liner is shaped and dimensioned to fit over the dish, and an anti-rotation mechanism prevents the liner from rotating with respect to the dish.

In accordance with an aspect of the invention, the anti-rotation mechanism includes a notch in the liner engaging the handle so that the liner cannot rotate in the dish.

In accordance with another aspect of the invention, the anti-rotation mechanism includes the liner having a plurality of spaced apart cavities which can engage a portion of the handle which is disposed on the side of the dish.

In accordance with another aspect of the invention, the anti-rotation mechanism includes the liner having an aperture which is engaged by a protuberance on the dish.

In accordance with another aspect of the invention, the anti-rotation mechanism includes the dish having an aperture which is engaged by a protuberance on the liner.

In accordance with another aspect of the invention, the liner has a saddle-shaped lip which is disposed above the notch and surrounds the base of the handle.

In accordance with another aspect of the invention, the handle is oriented at an angle of about 25° with the vertical.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is an exploded perspective view of a pet feeding system in accordance with the present invention;

FIG. 2 is a perspective view of the pet feeding system;

FIG. 3 is a top plan view of a dish with a handle;

FIG. 4 is a side elevation view of the dish and handle;

FIG. 5 is a top plan view of a liner for the pet dish;

FIG. 6 is a side elevation view of the liner;

FIG. 7 is a side elevation view showing a plurality of liners stacked in nested relationship;

DETAILED DESCRIPTION OF THE INVENTION

Figure 8:
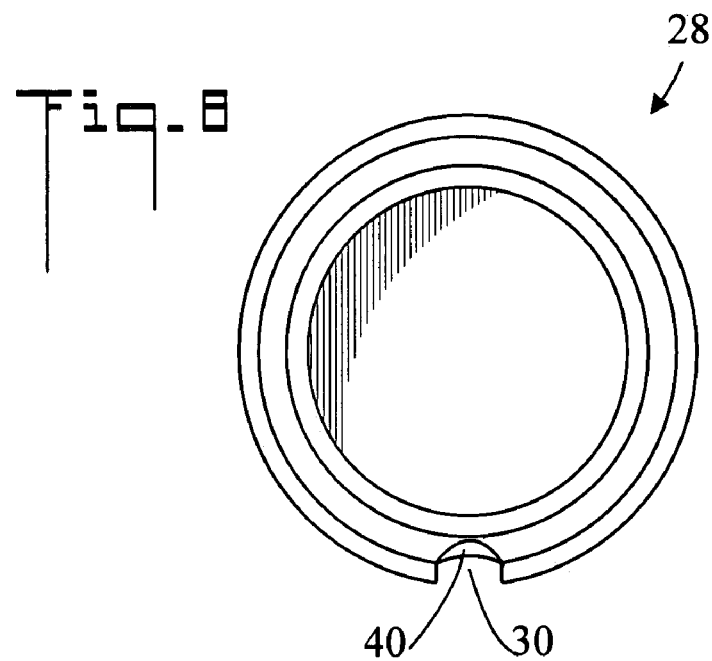
FIG. 8 is a top plan view of a second embodiment of the liner.

Referring initially to FIG. 1, there is illustrated an exploded perspective view of a pet feeding system in accordance with the present invention, generally designated as 20. Pet feeding system 20 includes a dish 22 which is of a standard size and shape. An elongated handle 24 is connected to dish 22 and upwardly projects therefrom. In an embodiment of the invention, dish 24 has a side 26 and handle 24 is connected to side 26. In the shown embodiment, handle 24 is integrally connected to dish 24, however it may also be appreciated that handle 24 could be attached by mechanical means such as screws. Dish 22 also has a bottom flange 27.

Pet feeding system 20 further includes a liner 28 which shaped and dimensioned to fit over dish 22 (refer also to FIG. 2). Liner 28 is the same shape as dish 22 and slightly larger so that it fits closely over dish 22. Liner 28 has an upwardly curved outside rim 32 which is useful in catching spilled food.

Pet feeding system 20 further includes an anti-rotation mechanism for preventing rotation of liner 28 with respect to dish 22. In the shown embodiment, the anti-rotation mechanism includes dish 22 having a side 26 with handle 24 connected to side 26. Liner 28 has a side 34 on which a notch 30 for receiving handle 24 is disposed. It is noted that as used herein the term "anti-rotation mechanism" means that liner 28 cannot freely rotate with respect to dish 22. A slight amount of rotation due to component tolerances is always possible.

FIG. 2 is a perspective view of pet feeding system 20 with dish 22 residing upon a support surface 500 such as a floor. Before being placed on support surface 500, liner 28 has been downwardly placed over dish 22 with liner outside rim 32 covering bottom flange 27 (refer to FIG. 1). When liner 28 is placed over dish 22, notch 30 engages (receives)

handle 24, and thereby prevents liner 28 from rotating with respect to dish 22 about dish central axis 25.

FIGS. 3 and 4 are top plan and side elevation views respectively of dish 22 and handle 24 showing side 26, bottom flange 27, and central axis 25. In an embodiment of the invention, handle 24 is oriented at an angle A of about 25° with the vertical. In another embodiment of the invention, handle 24 has a length L of about 20 to 30 inches. The inside surface of dish 22 is shown by dashed line 34.

FIGS. 5 and 6 are top plan and side elevation views respectively of liner 28, showing notch 30 and outside rim 32. The inside surface of liner 28 is shown by dashed line 36.

FIG. 7 is a side elevation view showing a plurality of liners 28 stacked in nested relationship (similar to the stacking of paper plates).

Figure 9:
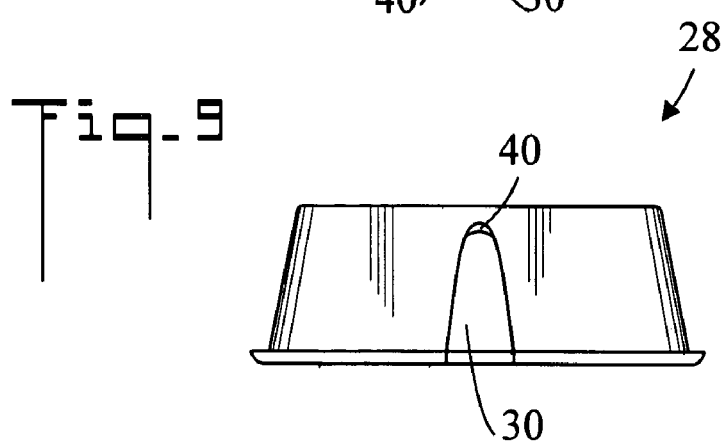
FIG. 9 is a side elevation view of the second embodiment liner.
Figure 10:
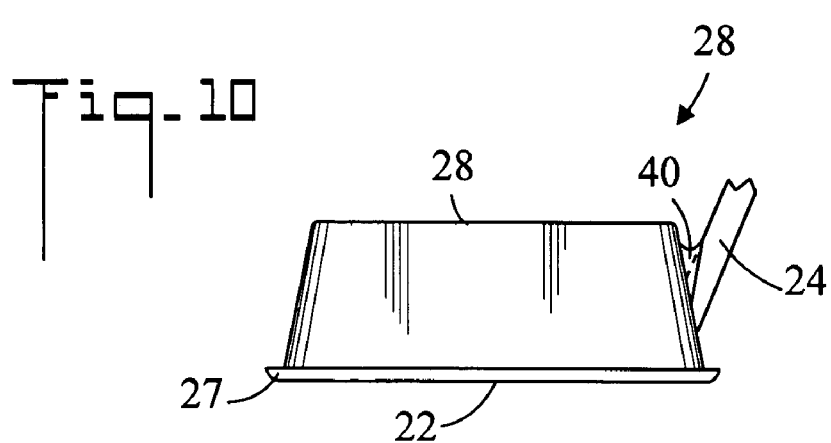
FIG. 10 is a fragmented rotated side elevation view showing the second embodiment liner and the handle.

FIGS. 8, 9, and 10 are top plan, side elevation, and rotated fragmented side elevation views respectively of a second embodiment of liner 28. In this embodiment, liner 28 has a saddle-shaped lip 40 disposed above notch 30. Lip 40 is shaped and dimensioned to surround the base portion of handle 24 (refer to FIG. 4). As such, lip 40 protects handle 24 from spilled food and thereby keeps it clean.

Figure 11:
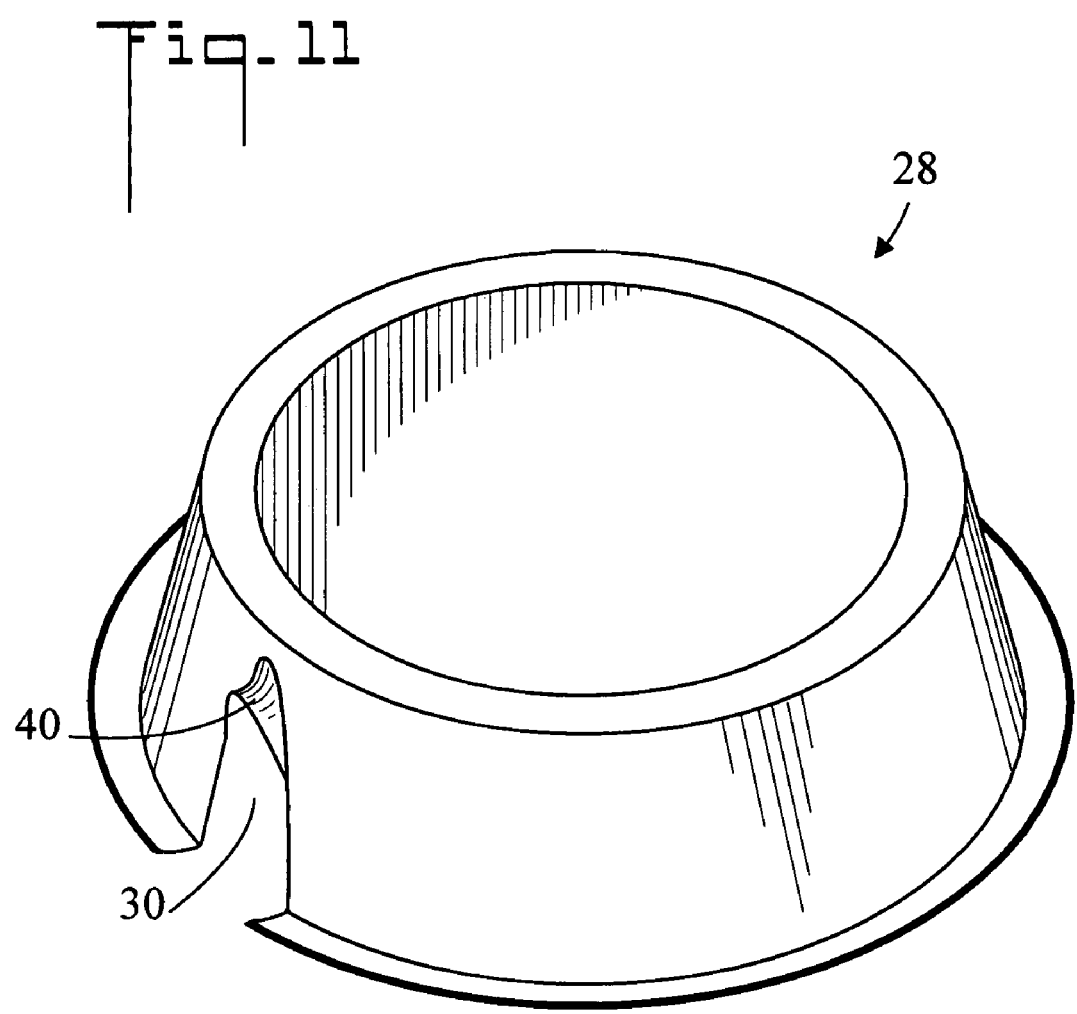
FIG. 11 is an enlarged perspective view of the liner showing a lip.

FIG. 11 is an enlarged perspective view of liner 28 showing saddle-shaped lip 40 residing above notch 30

Figures 12, 13:
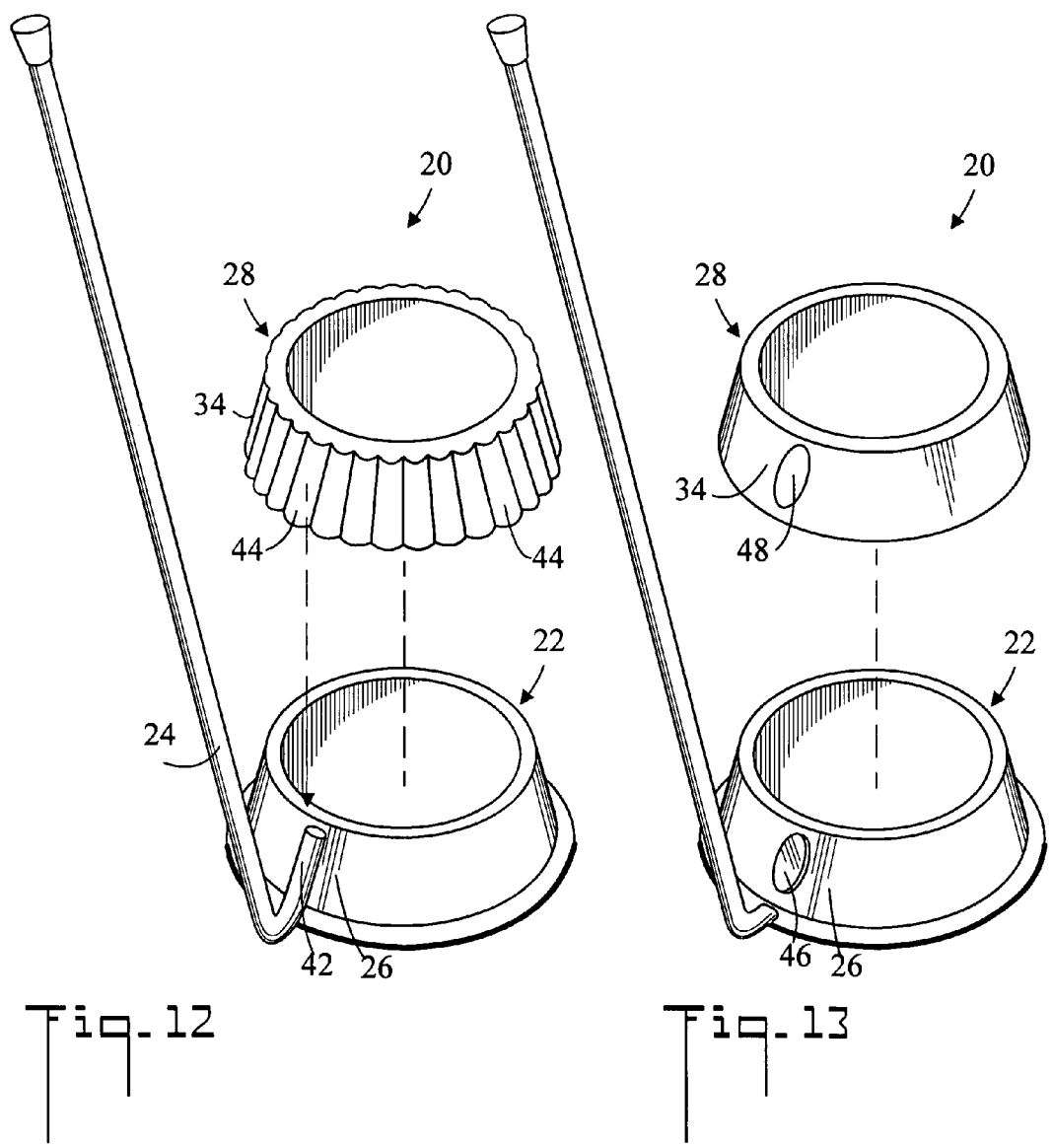
FIG. 12 is an exploded perspective view of another embodiment of the pet feeding system.
FIG. 13 is an exploded perspective view of another embodiment of the pet feeding system; and, FIG. 14 is an exploded perspective view of another embodiment of the pet feeding system.

FIG. 12 is an exploded perspective view of another embodiment of pet feeding system 20. In this embodiment the anti-rotation mechanism includes dish 22 having side 26 and handle 24 connected to side 26 and forming a protuberance 42 thereon. Liner 28 has side 34 which has a plurality of circumferentially spaced apart cavities 44, each cavity 44 being shaped and dimensioned to receive protuberance 42 on side 26 of dish 22 and thereby prevent rotation of liner 28 with respect to dish 22.

FIG. 13 is an exploded perspective view of another embodiment of the pet feeding system 20. In this embodiment the anti-rotation mechanism includes dish 22 having side 26 with a protuberance 46 disposed on side 26. Liner 28 has side 34 upon which an aperture 48 is disposed. Aperture 48 is shaped and dimensioned to receive protuberance 46 on side 26 of dish 22 and thereby prevent rotation of liner 28 with respect to dish 22.

FIG. 14 is an exploded perspective view of another embodiment of pet feeding system 20. In this embodiment the anti-rotation mechanism includes dish 22 having side 26 with an aperture 50 disposed on side 26. Liner 28 has side 34 upon which an inwardly projecting protuberance 52 is disposed. Protuberance 52 is shaped and dimensioned to be received by aperture 50 on side 26 of dish 22 and thereby prevent rotation of liner 28 with respect to dish 22.

In terms of use a method for feeding a pet includes:
(a) providing pet food;
(b) providing a support surface 500:
(c) providing a pet feeding system 20 including:
a dish 22;
a handle 24 connected to dish 22 and upwardly projecting therefrom;
a liner 28 shaped and dimensioned to fit over dish 22;
an anti-rotation mechanism for preventing rotation of liner 28 with respect to dish 22.
(d) placing liner 28 over dish 22 so that anti-rotation mechanism prevents liner 28 from rotating with respect to dish 22;
(e) placing the food in liner 28;
(f) using handle 24 to place dish 22 upon support surface 500; and,
(g) the pet consuming the food.

The method further including:
in step (c), the anti-rotation mechanism including:
dish 22 having a side 26;
handle 24 connected to side 26 of dish 22;
liner 28 having a side 34; and,
a notch 30 for receiving handle 24 disposed on side 34 of liner 28; and,
in step (d), causing notch 30 to engage handle 24.

The method further including:
in step (c), the anti-rotation mechanism including:
dish 22 having a side 26;
handle 24 connected to side 26 of dish 22 and forming a protuberance 42 thereon;
liner 28 having a side 34 having a plurality of circumferentially spaced apart cavities 44, each cavity 44 being shaped and dimensioned to receive protuberance 42 on side 26 of dish 22; and,
in step (d), causing one of the cavities 44 to engage protuberance 42.

The method further including:
in step (c), the anti-rotation mechanism including:
dish 22 having a side 26;
a protuberance 46 disposed on side 26 of dish 22;
liner 28 having a side 34;
an aperture 48 disposed on side 34 of liner 28, aperture 48 shaped and
dimensioned to receive protuberance 46 on side 26 of dish 22; and,
in step (d), causing aperture 48 to engage protuberance 46.

The method further including:
in step (c), the anti-rotation mechanism including:
dish 22 having a side 26;
an aperture 50 disposed on side 26 of dish 22;
liner 28 having a side 34;
an inwardly projecting protuberance 52 disposed on side 34 of liner 28, inwardly projecting protuberance 52 shaped and dimensioned to be received by aperture 50 on side 26 of dish 22; and,
in step (d), causing protuberance 52 to engage aperture 50.

The method further including:
after step (g), using handle 24 to pick up dish 22;
removing liner 28 from dish 22; and,
disposing of liner 22.

The preferred embodiments of the invention described herein are exemplary and numerous modifications, variations, and rearrangements can be readily envisioned to achieve an equivalent result, all of which are intended to be embraced within the scope of the appended claims.

We claim:

1. A pet feeding system, comprising:
a dish;
a handle connected to said dish and upwardly projecting therefrom;
a liner shaped and dimensioned to fit over said dish;
an anti-rotation mechanism for preventing rotation of said liner with respect to said dish;
said anti-rotation mechanism including;
said dish having a side;
said handle connected to said side of said dish;
said liner having a side; and,
a notch for receiving said handle disposed on said side of said liner; and,
said liner having a lip disposed above said notch.

2. The pet feeding dish according to claim 1, further including:
said lip having a saddle-shape.

* * * * *